(12) United States Patent
Shiomi

(10) Patent No.: US 9,588,603 B2
(45) Date of Patent: Mar. 7, 2017

(54) INFORMATION PROCESSING DEVICE

(71) Applicant: FUJITSU LIMITED, Kawasaki-shi, Kanagawa (JP)

(72) Inventor: Takuro Shiomi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 78 days.

(21) Appl. No.: 14/543,653

(22) Filed: Nov. 17, 2014

(65) Prior Publication Data

US 2015/0138117 A1    May 21, 2015

(30) Foreign Application Priority Data

Nov. 20, 2013 (JP) ................................. 2013-239596

(51) Int. Cl.
 G06F 3/0354 (2013.01)
 G06F 3/041 (2006.01)
 G06F 3/0488 (2013.01)

(52) U.S. Cl.
 CPC .......... *G06F 3/03545* (2013.01); *G06F 3/041* (2013.01); *G06F 3/04883* (2013.01)

(58) Field of Classification Search
 CPC ............. G06F 3/03545; G06F 3/04883; G06F 3/0416; G06F 3/041
 USPC ........................................................ 345/173
 See application file for complete search history.

(56) References Cited

U.S. PATENT DOCUMENTS

| 7,877,703 B1 * | 1/2011 | Fleming .................. G06F 9/541 715/788 |
| 9,213,365 B2 * | 12/2015 | Sirpal .................... G06F 1/1616 |
| 2002/0008692 A1 * | 1/2002 | Omura ...................... G06F 1/16 345/173 |
| 2009/0109187 A1 | 4/2009 | Noma |
| 2009/0160792 A1 | 6/2009 | Morohoshi et al. |
| 2010/0241957 A1 * | 9/2010 | Kim ....................... G06F 3/0416 715/702 |
| 2011/0163874 A1 * | 7/2011 | van Os ................ G01C 21/367 340/539.13 |
| 2011/0291985 A1 | 12/2011 | Wakako et al. |
| 2012/0162160 A1 | 6/2012 | Amano et al. |
| 2012/0304199 A1 | 11/2012 | Homma et al. |
| 2014/0078115 A1 | 3/2014 | Itsuki |

(Continued)

FOREIGN PATENT DOCUMENTS

| EP | 2000894 | 12/2008 |
| JP | 2008-129689 A | 6/2008 |

(Continued)

OTHER PUBLICATIONS

Extended European Search Report dated Mar. 20, 2015, from corresponding to EPC Application No. 14193350.7.

*Primary Examiner* — Fred Tzeng

(74) *Attorney, Agent, or Firm* — Maschoff Brennan

(57) ABSTRACT

An information processing device includes a memory, a display device that displays information on a screen, a detection device that detects a tip position of an indicator body on the display device in a state in which the information processing device is held, and a processor coupled to the memory, configured to change a display area displayed on the screen of the display device to an operation area whose vertex is the tip position of the indicator body and which is operable by the indicator body in a state in which the information processing device is held.

10 Claims, 14 Drawing Sheets

(56) References Cited

U.S. PATENT DOCUMENTS

| | | | | |
|---|---|---|---|---|
| 2015/0052481 A1* | 2/2015 | Ronkainen | ............ | G06F 3/0416 715/815 |
| 2015/0057063 A1* | 2/2015 | Tollstedt | ............. | G07F 17/3209 463/13 |
| 2015/0206282 A1* | 7/2015 | Kudo | ........................ | G06T 3/00 348/239 |

FOREIGN PATENT DOCUMENTS

| | | |
|---|---|---|
| JP | 2009-163278 A | 7/2009 |
| JP | 2010-079442 A | 4/2010 |
| JP | 2010-176190 A | 8/2010 |
| JP | 2012-009009 A | 1/2012 |
| JP | 2012-133528 A | 7/2012 |
| JP | 2012-242860 A | 12/2012 |
| JP | 2012-247960 A | 12/2012 |
| WO | 2006/106173 A1 | 10/2006 |
| WO | 2006/116869 A1 | 11/2006 |
| WO | 2010/096761 A1 | 8/2010 |

\* cited by examiner

FIG. 5

| ICON ID | ICON COORDINATES |
|---|---|
| 1 | (x11,y11) |
| 2 | (x22,y22) |
| ⋮ | ⋮ |

AREA 1

AREA 1'

AREA 1

AREA 1'

INFORMATION PROCESSING DEVICE

CROSS-REFERENCE TO RELATED APPLICATION

This application is based upon and claims the benefit of priority of the prior Japanese Patent Application No. 2013-239596, filed on Nov. 20, 2013, the entire contents of which are incorporated herein by reference.

FIELD

The embodiments discussed herein are related to an information processing device.

BACKGROUND

An information processing device such as a smartphone and a tablet terminal employs a touch panel. Regarding an information processing device including a touch panel, when a finger or a touch pen touches a display, the information processing device detects the touch as an input instruction and performs processing of the detected input instruction. Further, when a finger or a touch pen approaches a display, the information processing device detects the approach as an operation input and performs processing of the detected operation input.

Further, in recent years, information processing devices including a touch panel are requested to display a lot of information on a display for news browsing, digital magazine subscription, and the like, so that there are information processing devices including a large screen of 4 inches or more. Here, depending on use environment of an information processing device used by a user, one-handed operation is considered in which the user operates the touch panel with a finger of a hand that holds the information processing device. For example, when the user tries to operate the information processing device while standing in a train, the user holds a strap in the train with one hand in preparation for shake of the train, so that the user has to operate the information processing device with the other hand.

Here, a technique is known in which when a finger is detected to enter a detection area on a display surface, an icon is displayed at a position on the display surface immediately below the detected position of the finger. For example, the technique is disclosed in Japanese Laid-open Patent Publication No. 2012-9009.

SUMMARY

According to an aspect of the invention, an information processing device includes a memory, a display device that displays information on a screen, a detection device that detects a tip position of an indicator body on the display device in a state in which the information processing device is held, and a processor coupled to the memory, configured to change a display area displayed on the screen of the display device to an operation area whose vertex is the tip position of the indicator body and which is operable by the indicator body in a state in which the information processing device is held.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of an icon table;

DESCRIPTION OF EMBODIMENTS

Figure 1:
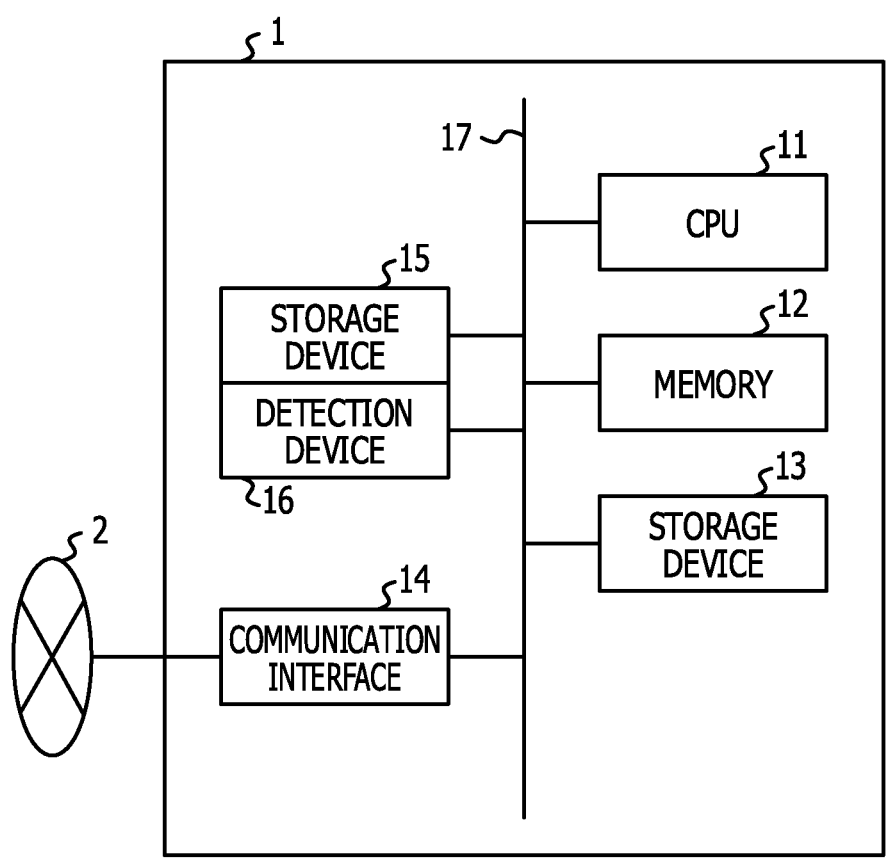
FIG. 1 is a diagram illustrating a configuration example of an information processing device.

FIG. 1 is a configuration example of an information processing device 1. The information processing device 1 includes a central processing unit (CPU) 11, a memory 12, a storage device 13, a communication interface 14, a display device 15, a detection device 16, and a bus 17.

The CPU 11 is an arithmetic device that executes a program that controls the information processing device 1 as well as executes various software programs.

The memory 12 is a storage device used by the CPU 11 to execute programs. As the memory 12, for example, a random access memory (RAM), a read only memory (ROM), and the like may be used. The RAM is used as a work area when the CPU 11 executes an instruction.

The storage device 13 stores programs executed by the CPU 11 and various pieces of information. Examples of the storage device 13 include a magnetic disk device, an optical disk device, a magneto-optical disk device, a tape device, and a hard disk drive.

The communication interface 14 connects the bus 17 with a network 2. The communication interface 14 is connected to the network 2 which is a Local Area Network (LAN), a Wide Area Network (WAN), the Internet, or the like through a communication line and further connected to other devices through the network 2. For example, a modem and a LAN adaptor may be employed as the communication interface 2.

The display device 15 is a device that displays data such as a document, an image, and functional information as well as a cursor, icons, and a toolbox on a display. Examples of the display include a thin film transistor (TFT) liquid crystal display, a plasma display, and an organic EL display.

The detection device 16 detects information operated on the display device 15. The detection device 16 detects information operated on a touch panel by a user by a electrostatic capacitance method and outputs the detected information to the CPU 11. The detection device 16 identifies a position at which approach of a fingertip is detected by electrostatic sensors described below.

Figure 2:
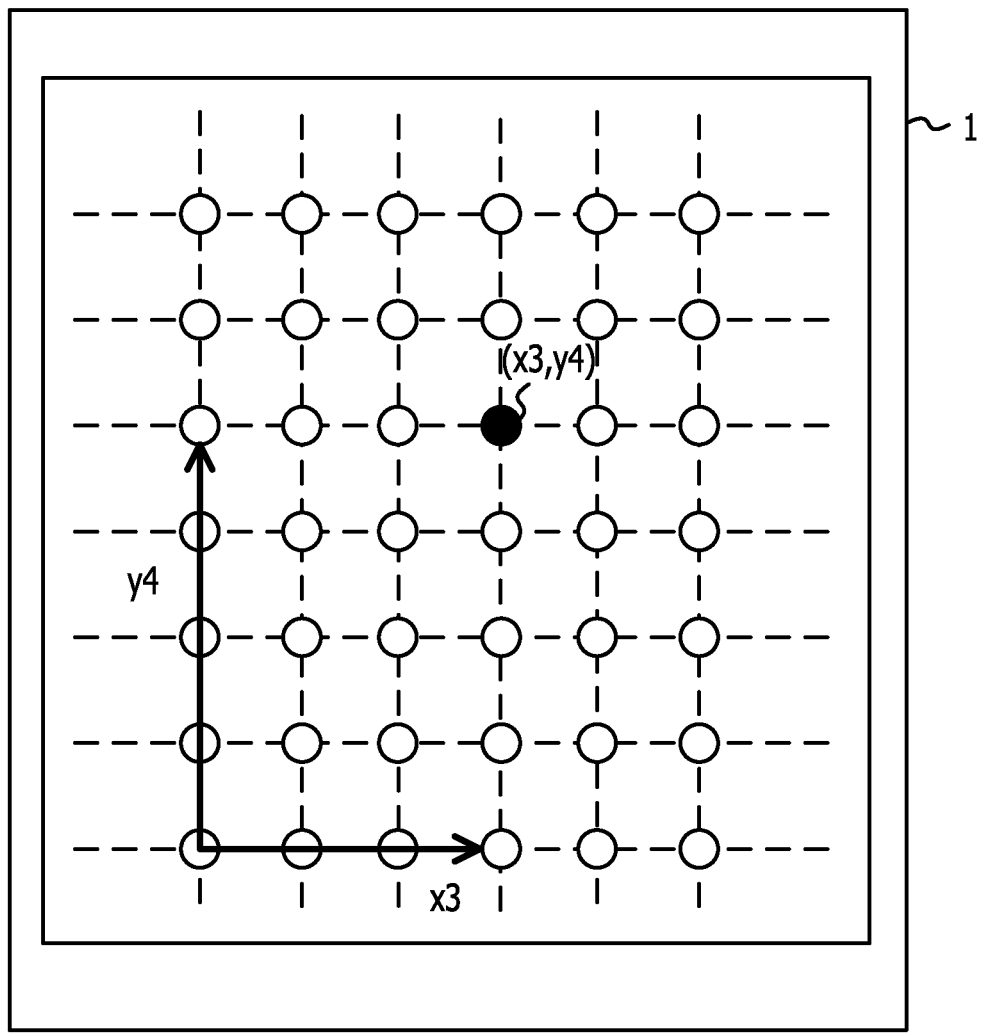
FIG. 2 is a diagram illustrating an arrangement example of electrostatic sensors.

FIG. 2 is a diagram illustrating an arrangement example of the electrostatic sensors of the information processing device 1. The electrostatic sensors are arranged in a matrix form with respect to the display. Each electrostatic sensor detects whether or not a finger (an example of an indicator body) approaches the electrostatic sensor from the amount of change of electrostatic capacitance. At this time, a detection position (XY coordinates) at which approach of a fingertip is detected is identified from a position at which an electrostatic sensor that detects the maximum amount of change of electrostatic capacitance is arranged. For example, when an electrostatic sensor located at a position of a black circle in FIG. 5 detects the maximum amount of change of electrostatic capacitance, the position at which approach of a fingertip is detected is identified to be coordinates (x3, y4) based on the coordinates (x0, y0). Although the position at which approach of a fingertip is detected is defined to be the position at which an electrostatic sensor that detects the maximum amount of change of electrostatic capacitance is arranged, it is not limited to this. For example, the position at which approach of a fingertip is detected may be identified based on the amount of change of electrostatic capacitance of a plurality of electrostatic sensors. The detection position is not limited to the XY coordinate system, but any system by which the position at which approach of a fingertip is detected may be identified may be used.

Figure 3:
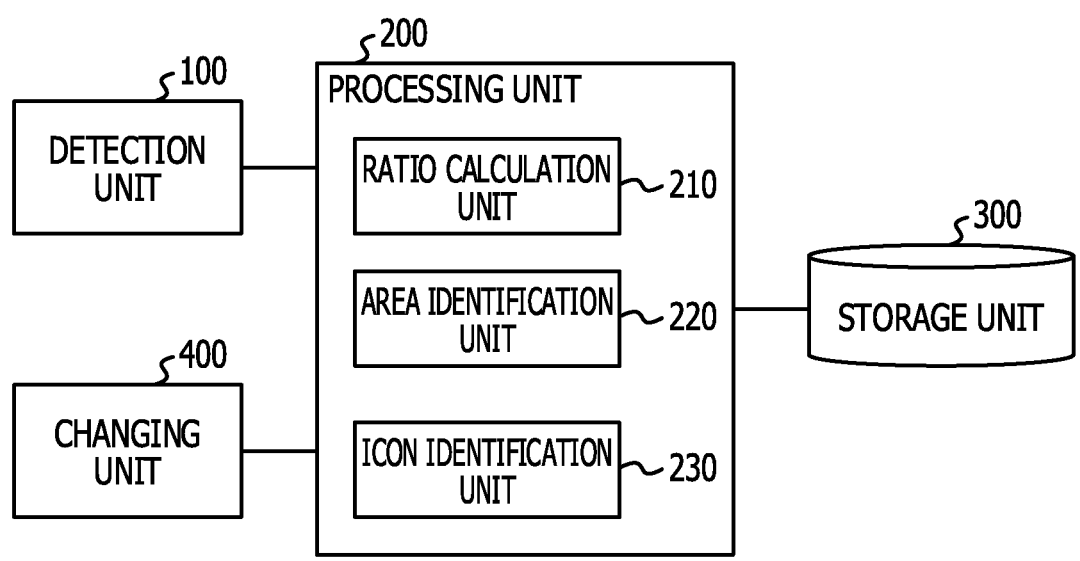
FIG. 3 is a diagram illustrating functional blocks of the information processing device.

FIG. 3 is a diagram illustrating functional blocks of the information processing device 1. The information processing device 1 according to the present embodiment includes a detection unit 100, a processing unit 200, a storage unit 300, and a changing unit 400. The processing unit 200 includes a ratio calculation unit 210, an area identification unit 220, and an icon identification unit 230.

Here, the function of the detection unit 100 is realized by the detection device 16. The function of the processing unit 200 is virtually realized when the CPU 11 reads and executes a program according to the present processing. The functions of the ratio calculation unit 210, the area identification unit 220, and the icon identification unit 230 are realized by the CPU 11. Further, the function of the storage unit 300 is realized by the memory 12 and the storage device 13. The function of the changing unit 400 is realized by the CPU 11.

The detection unit 100 is a functional unit that detects a position on a display surface immediately below a tip of a finger or an area close to the position when the finger approaches the display.

The ratio calculation unit 210 is a functional unit that calculates a scale ratio of a changed display area or an changed operation area with respect to a display area displayed on a screen in advance by comparing the position detected by the detection unit with a predetermined reference position.

The area identification unit 220 is a functional unit that identifies a display area or an operation area to be displayed on the screen according to the scale ratio calculated by the ratio calculation unit 210.

The icon identification unit 230 is a functional unit that identifies a position of an icon in an area identified by the area identification unit 220 according to the scale ratio calculated by the ratio calculation unit 210.

The storage unit 300 is a functional unit that holds various data such as a detection table 1000 described later.

The changing unit 400 is a functional unit that arranges an icon at the position identified by the icon identification unit 230 in the display area or the operation area identified by the area identification unit 220 and displays the icon on the display.

Figure 4:
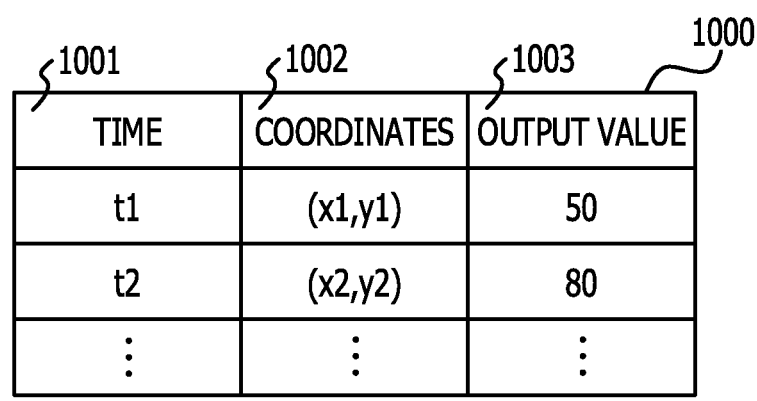
FIG. 4 is a diagram illustrating an example of a detection table.

FIG. 4 is a diagram illustrating an example of the detection table 1000 stored in the storage unit 300. The detection table 1000 stores a plurality of records, each of which includes an item "time" 1001, an item "coordinates" 1002, and an item "output value" 1003. Every time the detection unit 100 detects a position, a record in which a relationship between the item "time" 1001, the item "coordinates" 1002, and the item "output value" 1003 of the detection table 1000 is written is recorded in the detection table 1000. In the example of FIG. 3, an example is illustrated in which information related to the three items 1001 to 1003 is stored. However, among the three items, there may be one or two items whose information is not stored.

In the item "time" 1001, a time from when the detection unit 100 detects an approach or a touch of a fingertip to the display is registered. A user may arbitrarily set the time intervals of the detection.

In the item "coordinates" 1002, position coordinates of a position on the display surface immediately below the fingertip or position coordinates close to the position immediately below the fingertip are registered.

In the item "output value" 1003, an output value of an electrostatic sensor located at a position immediately below the fingertip or a position close to the position immediately below the fingertip is registered. For example, when the finger approaches the display, a value "1 to 99" is outputted. Further, when the finger touches the display, a value "100" is outputted. The approach of the finger to the display may be determined by whether the value is within a range predetermined by the user. For example, when the value is "30 to 80", it is determined that the finger approaches the display. Thereby, the detection unit 100 may determine that the finger approaches the display by considering a detection sensitivity that is different from person to person.

Here, a first record stores "t1" inputted in the item "time" 1001, "(x1, y1)" stored in the item "coordinates" 1002, and "50" stored in the item "output value" 1003 in association with each other. Specifically, the position coordinates indicated by the finger and the output value of the electrostatic sensor arranged at the indicated position are stored in the detection table 1000 in association with each other at every predetermined time.

Figure 5:
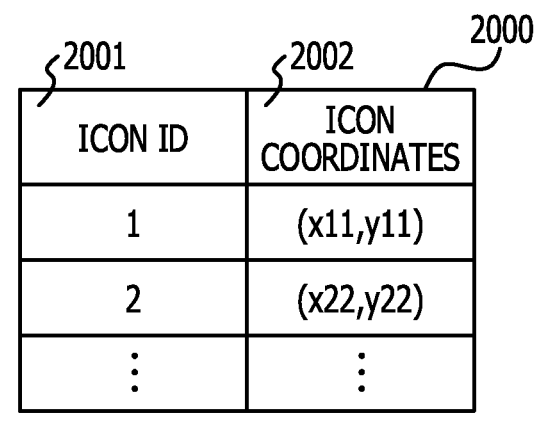

FIG. 5 is a diagram illustrating an example of an icon table 2000 stored in the storage unit 300. The icon table 2000 stores a plurality of records, each of which includes an item "icon ID" 2001 and an item "icon coordinates" 2002. Every time an icon is acquired, a record in which a relationship between the item "icon ID" 2001 and the item "icon coordinates" 2002 of the icon table 2000 is written is recorded in the icon table 2000.

In the item "icon ID" 2001, a value that may uniquely identify an icon is registered.

In the item "icon coordinates" 2002, position coordinates at which an icon is displayed on the display are registered.

Here, a first record stores "1" stored in the item "icon ID" 2001 and "(x11, y11)" stored in the item "icon coordinates" 2002 in association with each other. This means that an icon given the icon ID "1" is arranged on the "coordinates (x11, y11)" and displayed on the screen. A predetermined function is assigned to each icon.

Figure 6:
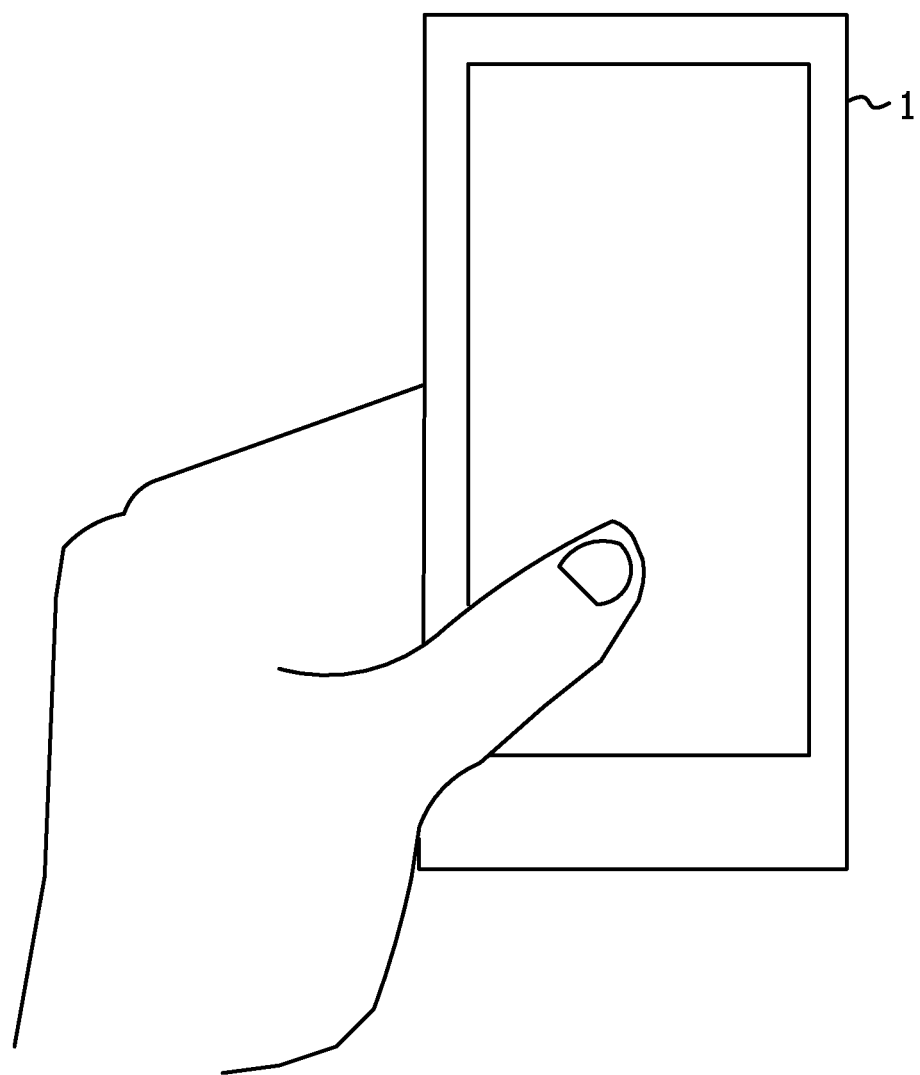
FIG. 6 is a diagram illustrating an example of one-handed operation of the information processing device by a user.

FIG. 6 is a diagram illustrating an example of one-handed operation of the information processing device 1 by a user.

Here, the one-handed operation means that the user operates a touch panel with a finger of one hand while holding the information processing device with the one hand. Specifically, the user operates the touch panel with a finger of the right hand while holding the information processing device with the right hand. Alternatively, the user operates the touch panel with a finger of the left hand while holding the information processing device 1 with the left hand. In the example of FIG. 6, a case is illustrated in which the information processing device 1 is held while the longitudinal direction of the display is set in the vertical direction. However, the information processing device 1 may be held while the short length direction of the display is set in the vertical direction.

Figure 7:
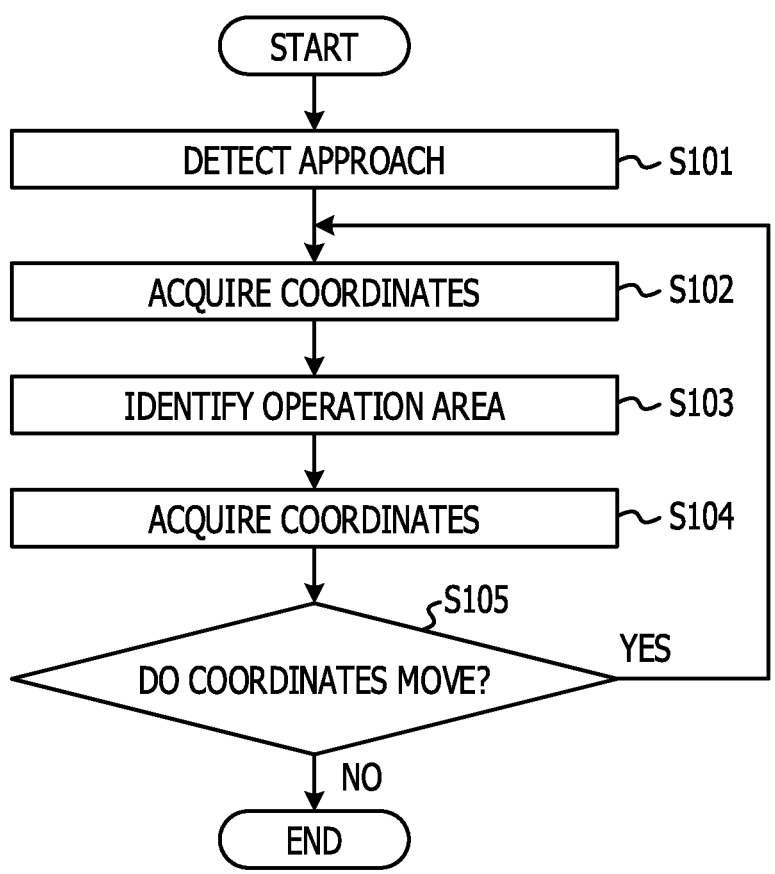
FIG. 7 is a flowchart for explaining a first embodiment.

Hereinafter, a first embodiment of the information processing device 1 will be described with reference to a flowchart illustrated in FIG. 7, diagrams for explaining an operation method illustrated in FIGS. 8A, 8B, 8C, and 8D, display screen examples illustrated in FIGS. 9A and 9B, and diagrams for explaining a scale ratio illustrated in FIGS. 10 and 11.

Figure 8A:
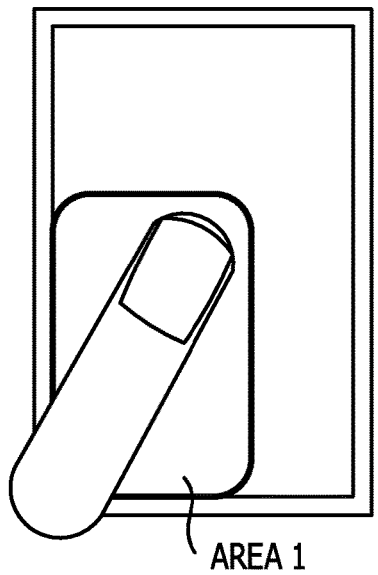
FIGS. 8A, 8B, 8C, and 8D are diagrams for explaining an operation method.
Figure 8B:
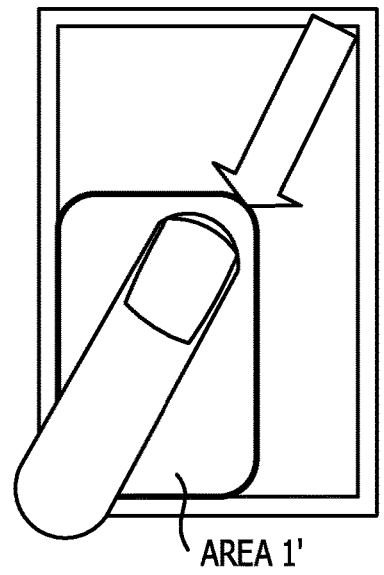
Figure 8C:
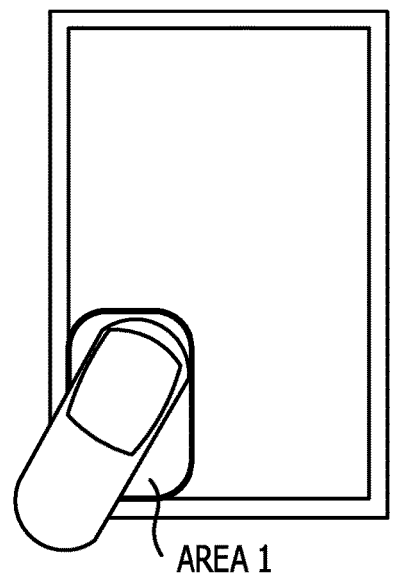

In step S101, the detection unit 100 detects that a finger approaches the display. Specifically, the detection unit 100 detects that a finger approaches a surface of the display based on a signal supplied from the detection device 16. For example, as illustrated in FIGS. 8A and 8C, the detection unit 100 detects a state in which a finger of one-handed operation floats over the display surface. Here, the area 1 indicates an area, which the finger reaches in the case of the one-handed operation, on the display surface.

In step S102, the area identification unit 220 acquires coordinates and an output value based on a signal supplied from the detection device 16. Specifically, the area identification unit 220 acquires position coordinates of a position on the display surface immediately below a fingertip or a position close to the position immediately below the fingertip and an output value of an electrostatic sensor located at a position immediately below the fingertip or a position close to the position immediately below the fingertip.

Figure 8D:
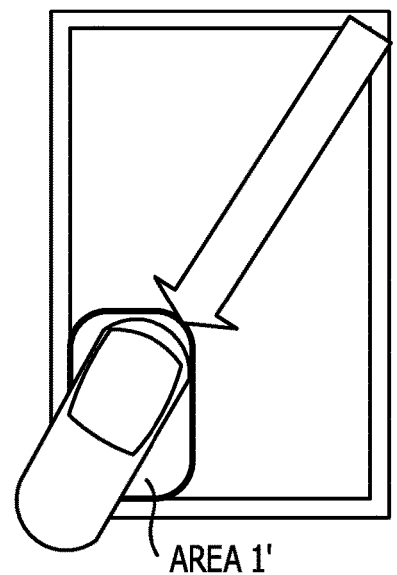

In step S103, the area identification unit 220 identifies an operation area displayed on the screen. As illustrated in FIGS. 8B and 8D, an area 1' displayed on the screen according to the position coordinates acquired in step S102 is identified. Specifically, the area identification unit 220 identifies a rectangular operation area formed from the position coordinates acquired in step S102 and a reference point. Then, the changing unit 400 changes a display screen. Here, an approach or a touch at a corner of the screen is detected, and the reference point is defined at the corner of the screen.

In step S104, the area identification unit 220 acquires coordinates and an output value based on a signal newly supplied from the detection device 16. Specifically, the area identification unit 220 acquires position coordinates of a position on the display surface immediately below a fingertip or a position close to the position immediately below the fingertip and an output value of an electrostatic sensor located at a position immediately below the fingertip or a position close to the position immediately below the fingertip.

In step S105, the processing unit 200 determines whether or not the coordinates acquired in step S104 moves with respect to the coordinates acquired in step S102. If the coordinates move, the processing unit 200 proceeds to step S102 (step S105: YES). On the other hand, if the coordinates do not move, the processing unit 200 ends the process (step S105: NO).

In this way, as illustrated in FIGS. 8B and 8D, it is possible to provide a device that may acquire an operable operation area changed according to a position of a fingertip even when the position of the fingertip changes dynamically.

Figure 9:
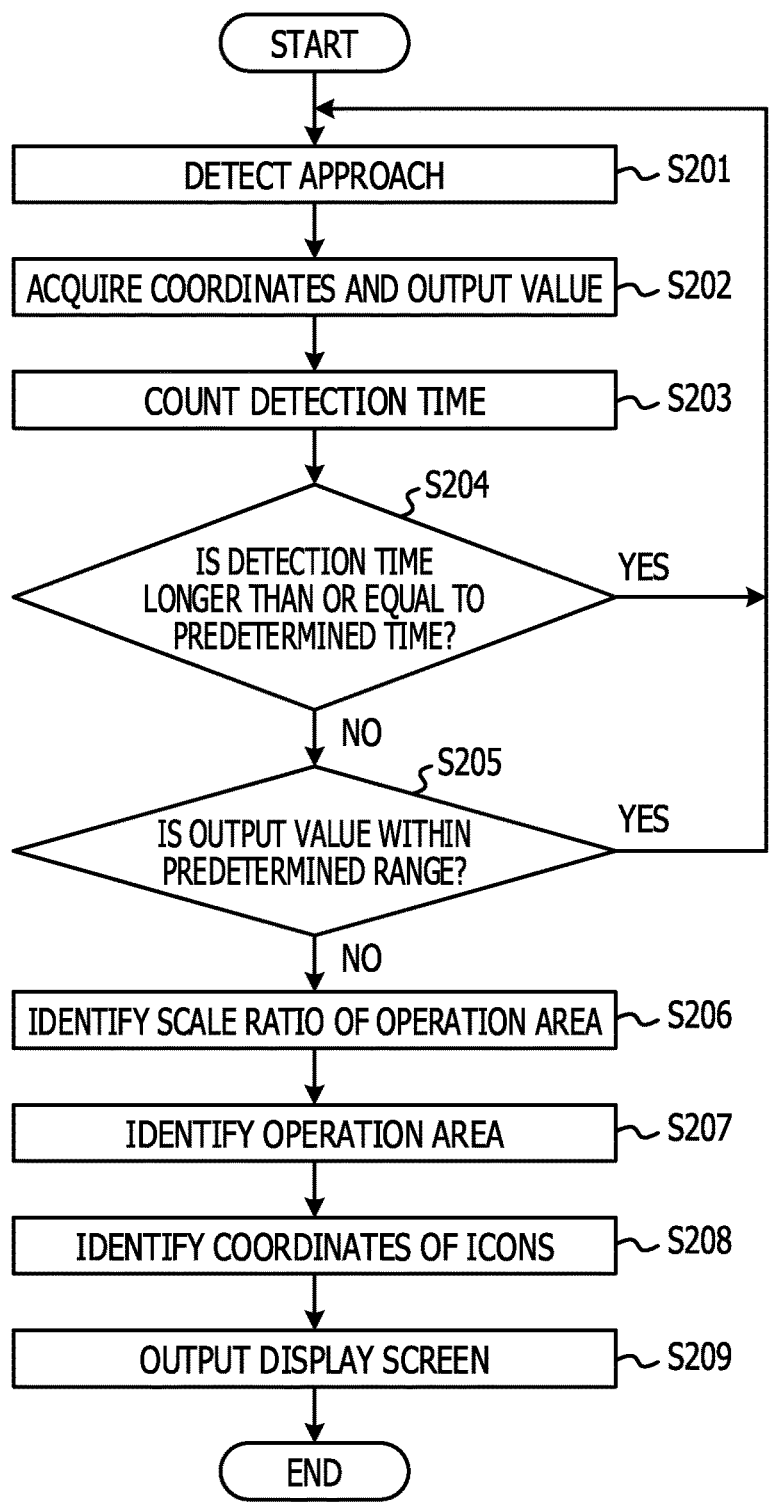
FIG. 9 is a flowchart for explaining a second embodiment.
Figure 10B:
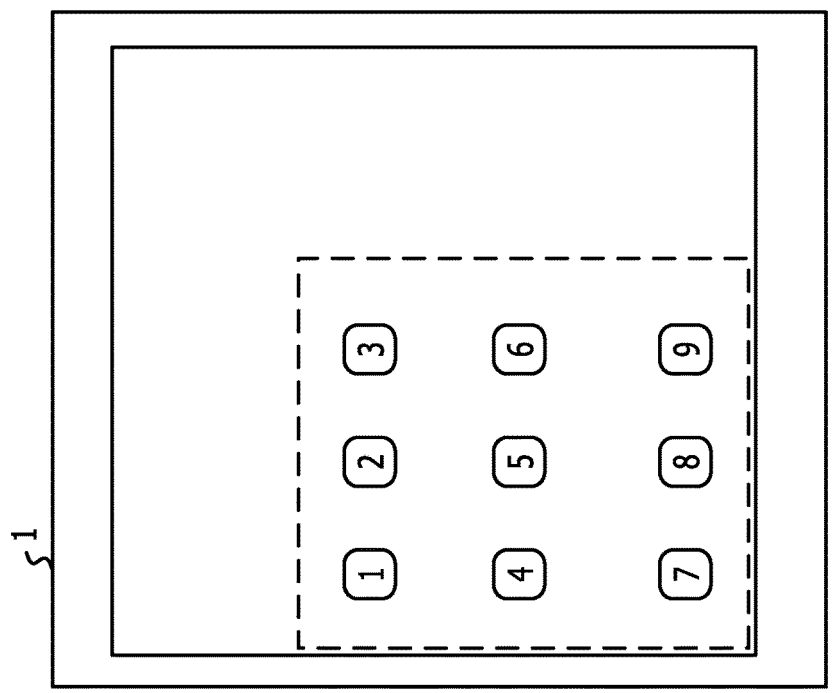
FIGS. 10A and 10B are diagrams illustrating a display screen example of the second embodiment.
Figure 11:
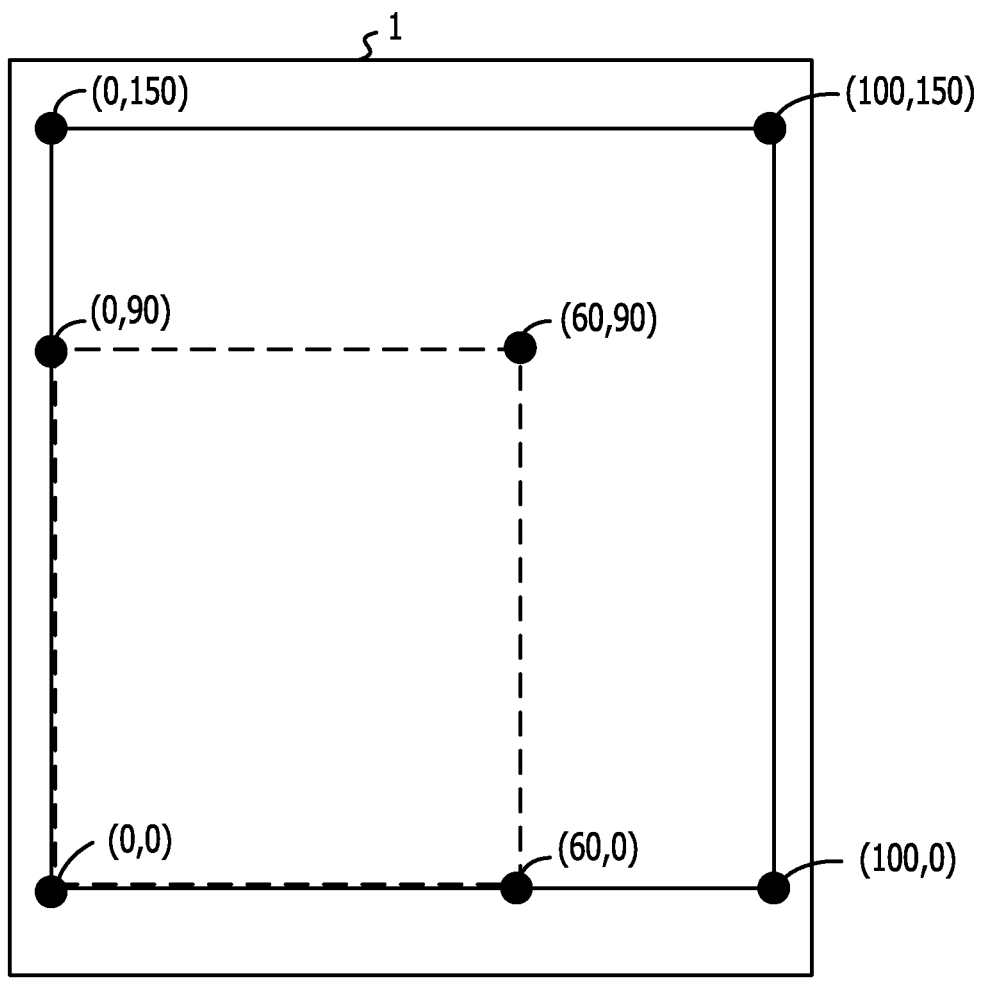
FIG. 11 is a first diagram for explaining a scale ratio.
Figure 12:
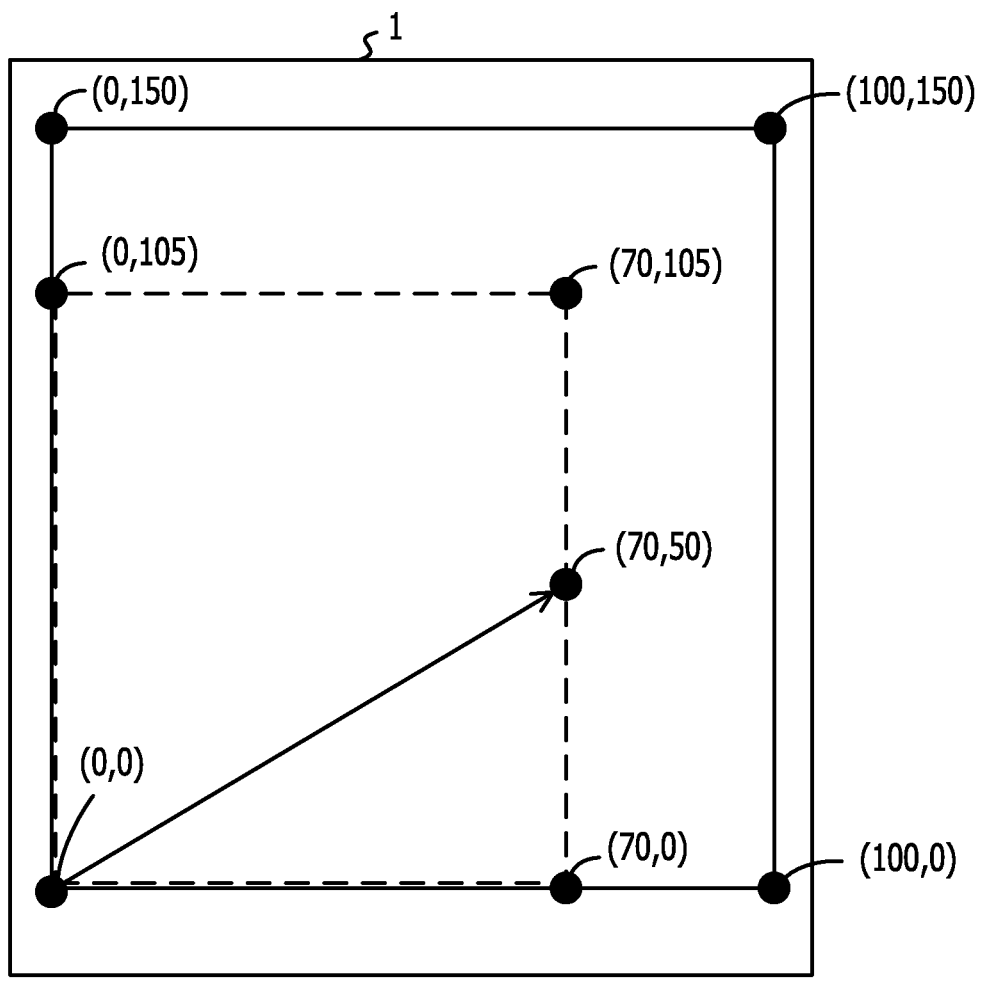
FIG. 12 is a second diagram for explaining the scale ratio.

Hereinafter, a second embodiment of the information processing device 1 will be described with reference to a flowchart illustrated in FIG. 9, diagrams for explaining an operation method illustrated in FIGS. 8A, 8B, 8C, and 8D, display screen examples illustrated in FIGS. 10A and 10B, and diagrams for explaining a scale ratio illustrated in FIGS. 11 and 12.

Also in the second embodiment, the hardware configuration of the information processing device 1 is as illustrated in FIGS. 1 and 2, the functional configuration is as illustrated in FIG. 3, the detection table 1000 is as illustrated in FIG. 4, and the icon table 2000 is as illustrated in FIG. 5.

Figure 10A:
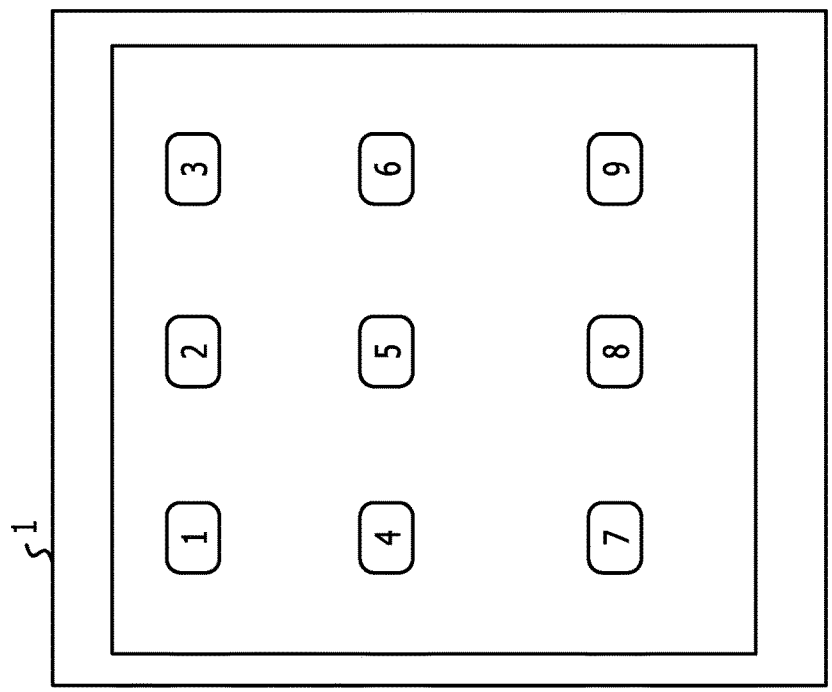

As an initial state of the operation, an initial screen illustrated in FIG. 10A is displayed on the display of the information processing device 1. The initial screen includes a plurality of icons in the screen. The initial screen is not limited to this. For example, the initial screen may be a web browser.

In step S201, the detection unit 201 detects that a finger approaches the display. Specifically, the detection unit 100 detects that the finger approaches a surface of the display based on a signal supplied from the detection device 16. For example, as illustrated in FIGS. 8A and 8C, the detection unit 100 detects a state in which a finger of one-handed operation floats over the display surface. Here, the area 1 indicates an area, which the finger reaches in the case of the one-handed operation, on the display surface.

In step S202, the area identification unit 220 acquires coordinates and an output value based on a signal supplied from the detection device 16. Specifically, the area identification unit 220 acquires position coordinates of a position on the display surface immediately below a fingertip or a position close to the position immediately below the fingertip and an output value of an electrostatic sensor located at a position immediately below the fingertip or a position close to the position immediately below the fingertip at every predetermined time. Then, the detection unit 100 stores the position coordinates indicated by the finger and the output value of the electrostatic sensor arranged at the indicated position in the detection table 1000 in association with each other at every predetermined time.

In step S203, the processing unit 200 counts detection time in which the finger approaches the display. Specifically, the processing unit 200 refers to the item "time" 1001 in the detection table 1000 and identifies a record in which the time stored in the item "time" 1001 is later than the time point t1 at which the approach of the fingertip is detected. Then, the processing unit 200 calculates the time in which the finger approaches the display by referring to the time stored in the item "time" 1001 in the specified record. For example, when the time in which the finger approaches the display is obtained by subtracting t1 from t2.

In step S204, the processing unit 200 determines whether or not the time identified in step S203 is longer than or equal to a predetermined time. If the time identified in step S203 is longer than or equal to the predetermined time, the processing unit 200 proceeds to step S201 (step S204: YES). On the other hand, if the time identified in step S203 is not longer than or equal to the predetermined time, the processing unit 200 proceeds to step S205 (step S204: NO). The predetermined time may be arbitrarily set by a user.

In step S205, the processing unit 200 determines whether or not the output value stored in the item "output value"

1003 in the record identified in step S203 is within a predetermined range. If the output value stored in the item "output value" 1003 in the record identified in step S203 is within the predetermined range, the processing unit 200 proceeds to step S201 (step S205: YES). On the other hand, if the output value stored in the item "output value" 1003 in the record identified in step S203 is not within the predetermined range, the processing unit 200 proceeds to step S206 (step S205: NO).

In step S206, the ratio calculation unit 210 identifies a scale ratio of an operation area with respect to a display area displayed in advance on the screen. Specifically, the ratio calculation unit 210 calculates average position coordinates based on each position coordinate stored the item "coordinates" 1002 in the record identified in step S203. Then, the ratio calculation unit 210 calculates the scale ratio based on the average position with respect to the coordinates of the vertexes that form the display area displayed in advance on the screen. For example, as illustrated in FIG. 11, when the average position coordinates are (60, 90) and coordinates of the vertexes that form the display area are (0, 0), (100, 0), (0, 150), and (100, 150), the ratio calculation unit 210 identifies the scale ratio to be 0.6 (for example, based on 60/100). Here, an approach or a touch at a corner of the screen is detected, and the reference point (0, 0) is defined at the corner of the screen. The identification method of the reference point is not limited to this. For example, the storage unit 300 stores in advance the vertexes that form the screen and a plurality of detection areas provided on the display in association with each other. Then, when an approach or a touch of a fingertip is detected in a detection area, the area identification unit 220 may define the vertexes that form a screen associated with the detection area as the reference point.

Here, the scale ratio of the operation area with respect to the display area may be obtained in both the X and Y coordinate directions. For example, as illustrated in FIG. 12, when the average position coordinates are (70, 50) and coordinates of the vertexes that form the display area are (0, 0), (100, 0), (0, 150), and (100, 150), the ratio calculation unit 210 identifies the scale ratio in the X axis direction to be 0.7 (for example, based on 70/100). The ratio calculation unit 210 identifies the scale ratio in the Y axis direction to be 0.33 (for example, based on 50/150).

In step S207, the area identification unit 220 identifies an operation area displayed on the screen. As illustrated in FIGS. 8B and 8D, an area 1' displayed on the screen is identified. Specifically, the area identification unit 220 identifies a rectangular operation area formed from the average position coordinates calculated in step S206 and a reference point. For example, as illustrated in FIG. 11, the area identification unit 220 identifies the rectangular operation area from the reference point (0, 0) and the average position coordinates (60, 90). The displayed area may be identified by four points. In this case, the displayed area is formed by the coordinates (0, 0), (60, 0), (60, 90), and (0, 90).

Here, a case will be described in which the position coordinates of a position immediately below the fingertip or a position close to the position immediately below the fingertip on the display surface of the display are not on a diagonal line of the display. At this time, the area identification unit 220 calculates coordinates that form an area having the same ratio of vertical and horizontal sizes as that of the screen. Specifically, the area identification unit 220 identifies an operation area displayed on the screen based on the coordinates of the vertexes that form the display area and the scale ratio of either the X axis direction or the Y axis direction identified in step S206. For example, as illustrated in FIG. 12, the average position coordinates calculated in step S206 is (70, 50). The area identification unit 220 identifies (70, 105) by multiplying (100, 150) that are the position coordinates diagonal to the reference point (0, 0) by the scale ratio 0.7 in the X axis direction identified in step S206. Then, the area identification unit 220 identifies a rectangular operation area from the reference point (0, 0) and the diagonal position coordinates (100, 150).

At this time, when the horizontal size of the screen is W and the vertical size of the screen is H, either the scale ratio in the X axis direction or the scale ratio in the Y axis direction is identified based on (1) by using the screen size (W, H) and an average position coordinates (x, y).

$$\frac{x}{y} > \frac{W}{H} \tag{1}$$

In step S208, the icon identification unit 230 identifies position coordinates of icons in the operation area. Specifically, the icon identification unit 230 identifies position coordinates of icons in the operation area by multiplying each of sets of coordinates stored in the item "icon coordinates" 2002 in the icon table 2000 by the scale ratio calculated in step S206.

In step S209, the change unit 400 outputs a display screen. For example, the changed screen illustrated in FIG. 10B is displayed on the display of the information processing device 1. Specifically, the change unit 400 outputs the operation area identified in step S207 on the display. Specifically, the change unit 400 outputs each icon on the display at the position coordinates identified in step S208 in the changed operation area.

From the above, when the information processing device 1 detects that a finger is held for a certain time in a state in which the finger floats above the screen, the information processing device 1 reduces and displays the entire screen in a rectangular range with a corner of the screen and the finger as opposite corners. Further, when the information processing device 1 detects that a fingertip is held for a certain time in a state in which the finger floats above the screen, if the information processing device 1 detects a touch in the lower left portion of the screen, the information processing device 1 reduces and displays the screen in the lower left direction, and if the information processing device 1 detects a touch in the lower right portion of the screen, the information processing device 1 reduces and displays the screen in the lower right direction. Thereby, when a user stretches out a finger toward an icon which the user wants to operate, the user may move the icon in a range which the tip of the finger reaches. Therefore, it is possible to provide a device that acquires an operable area regardless of the length of a finger of the user due to the individual differences.

Figure 13:
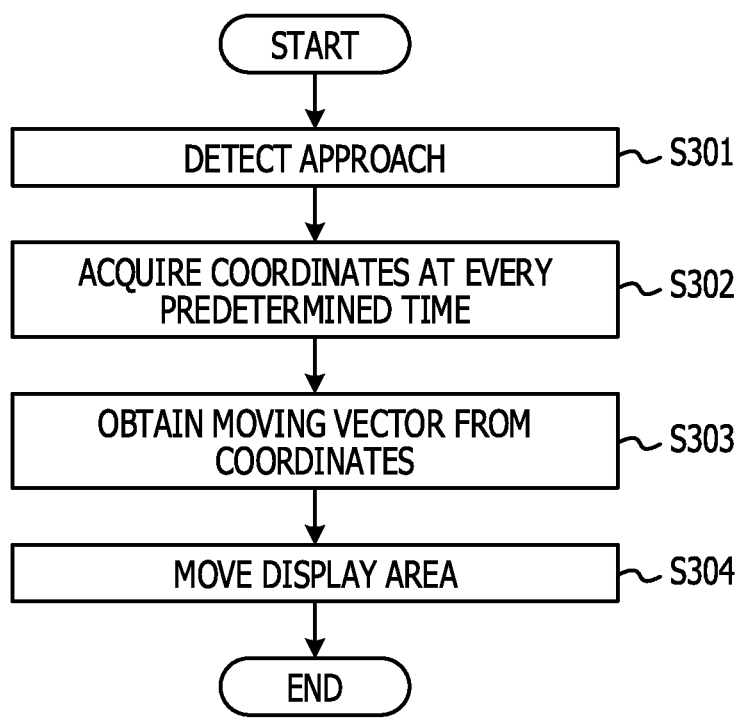
FIG. 13 is a flowchart for explaining a third embodiment.
Figure 14B:
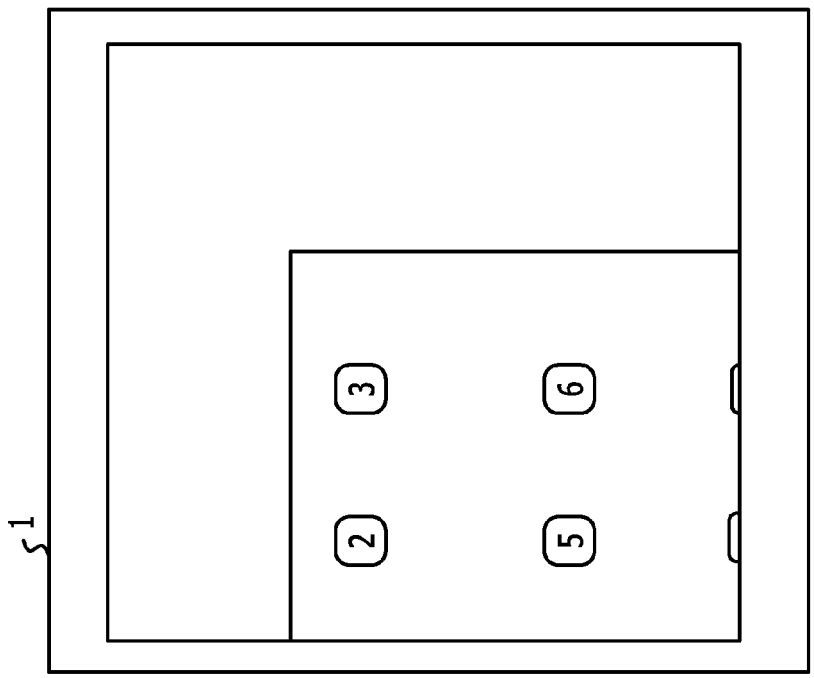
FIGS. 14A and 14B are diagrams illustrating a display screen example of the third embodiment.

A third embodiment of the information processing device 1 will be described with reference to a flowchart illustrated in FIG. 13 and display screen examples illustrated in FIGS. 14A and 14B.

Also in the third embodiment, the hardware configuration of the information processing device 1 is as illustrated in FIGS. 1 and 2, the functional configuration is as illustrated in FIG. 3, the detection table 1000 is as illustrated in FIG. 4, and the icon table 2000 is as illustrated in FIG. 5.

Figure 14A:
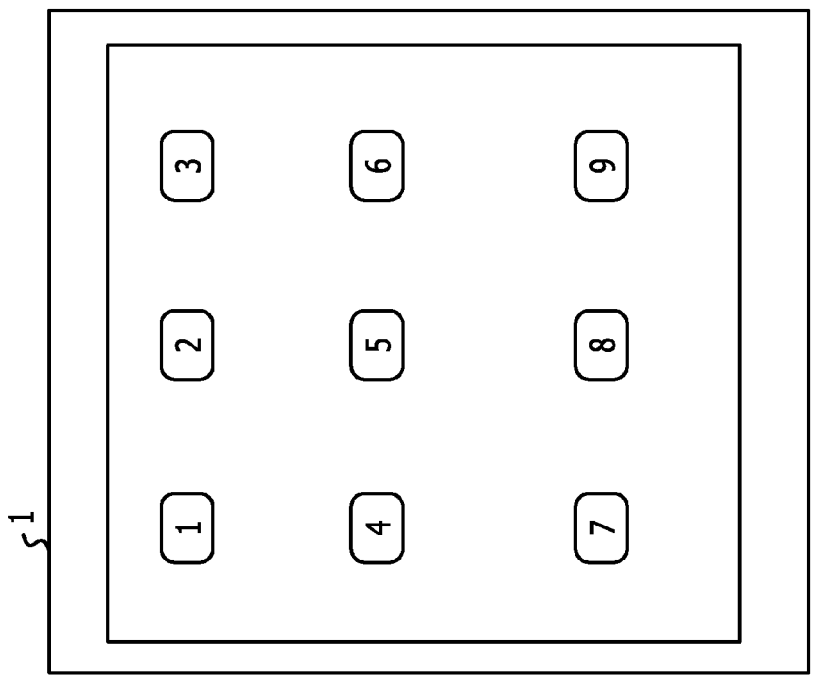

As an initial state of the operation, an initial screen illustrated in FIG. 14A is displayed on the display of the information processing device 1. The initial screen includes a plurality of icons in the screen. The initial screen is not limited to this. For example, the initial screen may be a web browser.

In step S301, the detection unit 100 detects that a finger approaches the display. Specifically, the detection unit 100 detects that the finger approaches a surface of the display based on a signal supplied from the detection device 16.

In step S302, the area identification unit 220 acquires coordinates and an output value based on a signal supplied from the detection device 16 at every predetermined time. Specifically, the area identification unit 220 acquires position coordinates of a position on the display surface immediately below a fingertip or a position close to the position immediately below the fingertip and an output value of an electrostatic sensor located at a position immediately below the fingertip or a position close to the position immediately below the fingertip at every predetermined time. Then, the detection unit 100 stores the position coordinates indicated by the finger and the output value of the electrostatic sensor arranged at the indicated position in the detection table 1000 in association with each other at every predetermined time.

In step S303, the processing unit 200 obtains a moving vector according to position coordinates at a position immediately below the fingertip or a position close to the position immediately below the fingertip on the display surface of the display. Specifically, the processing unit 200 refers to the item "time" 1001 and the item "coordinates"1002 in the detection table 1000. Then, the processing unit 200 obtains an amount of change between the position coordinates at a certain time and the position coordinates after a predetermined time elapses.

In step S304, the processing unit 200 moves the display area according to the identified moving vector. Specifically, the processing unit 200 moves each of sets of the coordinates that form the display area by the amount of change obtained in step S303. Then, the change unit 400 outputs a display area formed by the moved coordinates on the display. For example, the moved screen illustrated in FIG. 14B is displayed on the display of the information processing device 1.

Thereby, it is possible to move an icon at a position which the fingertip reaches while the size of the icon is maintained, so that it is possible to improve user operability.

Here, a reduction of the display area will be described by distinguishing between a case in which a user operates a touch panel with a finger of the right hand while holding the information processing device with the right hand and a case in which a user operates a touch panel with a finger of the left hand while holding the information processing device with the left hand. In a state in which position coordinates of a position immediately below a fingertip or a position close to the position immediately below the fingertip on the display surface of the display do not change for a certain period of time, the processing device 200 detects an amount of change from the position coordinates. Then the processing unit 200 calculates which corner of the four corners of the display screen the moving vector obtained in step S303 faces and reduces the display area according to the moving vector. For example, when the moving vector has the lower right direction of the display screen, the processing unit 200 reduces the display area toward the lower right corner of the display screen. On the other hand, when the moving vector has the lower left direction of the display screen, the processing unit 200 reduces the display area toward the lower left corner of the display screen.

Further, in a state in which the display area is reduced, the processing unit 200 enlarges the display area according to the moving vector obtained in step S303. For example, in a state in which the display area is reduced toward the lower right corner of the display screen, the processing unit 200 display the display area in the entire screen based on a detection of a moving vector having the upper left direction of the display screen. The magnification of the enlargement may be identified by the amount of change.

Thereby, it is possible to reduce the display area in a range in which an icon is reached by considering the operation state of the user. Further, the reduced display area may be enlarged.

Here, in the embodiments described above, it is described that the display area and the operation area are different from each other. However, the display area and the operation area may be the same area. Further, the embodiments described above may be implemented only when a predetermined mode is set. For example, only when a proximity sensor is activated, each process described above may be performed.

It is possible to combine the embodiments described above with each other without departing from the object thereof and implement the embodiments. Further, it goes without saying that the present application is not limited to the embodiments described above, but includes other modified examples and application examples without departing from the scope of the application, which is described in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An information processing device comprising:
   a memory;
   a display device that includes a screen and that displays information in a display area of the screen;
   a detection device that detects a tip position of an indicator body on the screen when the information processing device is in a state in which the information processing device is being held; and
   a processor coupled to the memory and configured to change the display area from an initial area of the screen to an operation area of the screen, the operation area including a vertex at the detected tip position and being operable by the indicator body in the state in which the information processing device is being held.
2. The information processing device according to claim 1,
   wherein the operation area is a first operation area formed according to a first position indicated by a tip of the indicator body at a first timing and when the first position is different from a second position indicated by the tip of the indicator body at a second timing that is different from the first timing, the processor is configured to change the display area from the first operation area to a second operation area formed according to the second position.

3. The information processing device according to claim 2,
wherein the processor is configured to reduce and display the operation area in a first direction when either an approach or a touch is detected in the first direction with respect to the second position on a display surface of the display device and reduce and display the operation area in a second direction when either an approach or a touch is detected in the second direction, which is different from the first direction, with respect to the second position on the display surface.

4. The information processing device according to claim 3,
wherein the first direction is a direction toward a lower right corner of the screen and the second direction is a direction toward a lower left corner of the screen.

5. The information processing device according to claim 1,
wherein the processor is configured to calculate a scale ratio at a position indicated by a tip of the indicator body with respect to a reference position that forms the screen, identify a changed position of an icon in the operation area based on a position of the icon displayed on the screen and the scale ratio, arrange the icon at the changed position, and causes the display device to display the icon.

6. The information processing device according to claim 1,
wherein when the tip position of the indicator body is not on a diagonal line of the screen, the processor is configured to cause the display device to size the operation area such that the operation area has the same ratio of vertical and horizontal sizes as that of the screen according to the tip position of the indicator body with respect to the screen.

7. The information processing device according to claim 1,
wherein the processor is configured to move the display area based on a first position indicated by a tip of the indicator body at a first timing and a second position indicated by the tip of the indicator body at a second timing that is different from the first timing.

8. The information processing device according to claim 1,
wherein the processor is configured to enlarge the display area based on a first position indicated by a tip of the indicator body at a first timing and a second position indicated by the tip of the indicator body at a second timing that is different from the first timing.

9. A machine readable medium storing a program that, when executed by a processor, causes the processor to perform operations comprising:
detecting a tip position of an indicator body on a screen of a display device of an information processing device when the information processing device is in a state in which information processing device is being held; and
changing a display area of the screen from an initial area of the screen to an operation area of the screen, the operation area including a vertex at the tip position and being operable by the indicator body in the state in which the information processing device is being held.

10. The machine readable medium storing the program according to claim 9,
wherein the operation area is a first operation area formed according to a first position indicated by a tip of the indicator body at a first timing and when the first position is different from a second position indicated by the tip of the indicator body at a second timing that is different from the first timing, the program causes the information processing device to perform changing the display area from the first operation area to a second operation area formed according to the second position.

* * * * *